United States Patent [19]

Shuey

[11] Patent Number: 5,185,591
[45] Date of Patent: Feb. 9, 1993

[54] POWER DISTRIBUTION LINE COMMUNICATION SYSTEM FOR AND METHOD OF REDUCING EFFECTS OF SIGNAL CANCELLATION

[75] Inventor: Kenneth C. Shuey, Raleigh, N.C.

[73] Assignee: ABB Power T&D Co., Inc., Blue Bell, Pa.

[21] Appl. No.: 729,072

[22] Filed: Jul. 12, 1991

[51] Int. Cl.⁵ .................. H04B 3/00; H04L 27/00
[52] U.S. Cl. .................... 340/310 A; 340/310 R; 375/37; 375/48
[58] Field of Search ........ 340/310 A, 310 R, 310 CP; 375/36, 37, 48, 66; 455/3-5, 17, 61, 63, 65, 3.1, 3.3

[56] References Cited

U.S. PATENT DOCUMENTS

| | | | |
|---|---|---|---|
| 4,577,333 | 3/1986 | Lewis et al. | 375/66 |
| 4,882,552 | 11/1989 | Harris | 375/66 |
| 4,968,970 | 11/1990 | LaPorte | 340/310 A |

Primary Examiner—Donnie L. Crosland
Attorney, Agent, or Firm—Woodcock Washburn Kurtz Mackiewicz & Norris

[57] ABSTRACT

A power distribution line communication system for, and method of, reducing effects of signal cancellation at locations along the distribution line due to standing waves caused by reflections of a carrier signal impressed on the distribution line. A same outgoing data signal is modulated on each of a plurality of carrier signals having different frequencies. The carrier signal frequencies are selected such that all of the carrier signals will not experience signal cancellation at a same location on the distribution line. The modulated carrier signals are simultaneously impressed on the distribution line for transmission to remote locations, thereby ensuring reception of the outgoing data signal at each remote location.

48 Claims, 4 Drawing Sheets

MILES FROM END OF LINE

POWER DISTRIBUTION LINE COMMUNICATION SYSTEM FOR AND METHOD OF REDUCING EFFECTS OF SIGNAL CANCELLATION

FIELD OF THE INVENTION

The present invention relates to power distribution line communication systems and, more particularly, to a power distribution line communication system for reducing effects of signal cancellation at locations along the distribution line due to standing waves caused by reflections of a carrier signal impressed on the distribution line.

BACKGROUND OF THE INVENTION

Communication systems for communicating between remote locations via a power distribution line are generally well known in the art. Electric utilities typically employ such systems to provide bi-directional communication between an electric generating station and remote customer sites such as homes or office buildings. Such power distribution line communication systems typically operate by modulating a single carrier signal with an outgoing data signal and impressing the modulated carrier signal onto the distribution line for transmission to the remote locations. The modulated carrier signal is then demodulated at the remote locations along the distribution line to recover the outgoing data signal. Thus, for example, an electric utility employing such a system could receive meter data from customer sites without having to send a service person.

Problems with signal reception at certain remote locations arise, however, because the power distribution line typically is open-circuited at one end, or because of other conditions that cause impedance mismatches. Consequently, a single modulated carrier signal propagating along the distribution line is reflected at the open-circuit end due to the large impedance mismatch provided by the open-circuit. The reflection propagates in the opposite direction at the same frequency and combines with the transmitted signal, creating a standing wave along the distribution line. As a result, the modulated carrier signal amplitude is cancelled at fixed locations along the distribution line, severely inhibiting signal reception at these fixed locations. Consequently, for example, electric utilities employing such systems are unable to communicate with customers at those fixed locations.

The distance between fixed locations of signal cancellation is a function of the frequency of the carrier signal, and therefore, carrier signals of different frequencies will experience signal cancellation at different locations along the same distribution line. However, because of the typically large number of remote locations in a power line communication system, some remote locations will experience signal cancellation no matter what frequency carrier is used. Thus, the problem of signal cancellation at certain remote locations cannot be solved simply by using a different carrier frequency.

One possible solution to the problem is to provide signal repeaters to boost the modulated carrier signal amplitude near these fixed locations. Such a solution is described in U.S. Pat. No. 4,357,598 in conjunction with a three-phase power distribution network communication system. While signal repeaters seemingly overcome the problem of signal cancellation at the fixed locations, the addition of signal repeaters increases the cost and complexity of the communication system. Furthermore, installation requires a burdensome determination of the optimum locations for the signal repeaters.

Another possible solution to the problem is to apply a technique referred to as frequency hopping. Such a technique is disclosed in conjunction with a distribution line communication system in U.S. Pat. No. 4,800,363. The frequency hopping technique involves continuously varying the frequency of the single carrier in a single carrier system. Because the fixed locations of signal cancellation are a function of the carrier signal frequency, the locations of signal cancellation will continuously change such that each remote location is reached equally well on average. However, at any given time, certain locations will still experience signal cancellation. Furthermore, the circuitry required to implement the frequency hopping technique is complex and synchronization between transmitters and receivers is required.

Consequently there exists a need for a distribution line communication system and/or method for reducing the effects of signal cancellation due to standing waves, thereby ensuring continuous reception of data at every remote location. Accordingly, the present invention is directed to a power distribution line communication system for reducing effects of signal cancellation at locations along the distribution line due to standing waves caused by reflections of a carrier signal impressed on the distribution line. The present invention satisfies the aforementioned need and overcomes the limitations inherent in the prior art by modulating the same outgoing data signal on a plurality of carrier signals having different frequencies and simultaneously impressing the modulated carrier signals on the distribution line for transmission to remote locations. The carrier signal frequencies are selected such that all of the carrier signals will not cancel at a same location on the distribution line. Thus at least one carrier signal will have a substantial amplitude at each remote location, thereby avoiding the need for signal repeaters and ensuring continuous reception of data at every remote location.

SUMMARY OF THE INVENTION

Briefly stated, the present invention comprises a power distribution line communication system for reducing effects of signal cancellation at locations along the distribution line due to standing waves caused by reflections of a carrier signal impressed on the distribution line. The distribution line communication system comprises data generating means for generating an outgoing data signal. Signal generation means generates a plurality of carrier signals, each having a different frequency. The frequencies are selected such that all of the carrier signals will not cancel at a same location along the distribution line. Modulation means individually modulate each of the carrier signals with the same outgoing data signal. Amplifier means, operatively coupled to the distribution line, amplifies the modulated carrier signals and impresses the signals on the distribution line for transmission to remote locations. Because the modulated carrier signals will not cancel at a same location, the outgoing data signal is recoverable at each remote location.

Receiver means is operatively coupled to the distribution line at each of the remote locations. The receiver means demodulates the modulated carrier signals and recovers an incoming data signal from each of the demodulated signals. Each of the incoming data signals is a substantial reproduction of the outgoing data signal.

In a preferred embodiment of the present invention, each of the remote locations has both a transmitter and a receiver for providing two-way communication among every remote location. The transmitter comprises the data generating means, the signal generation means, the modulation means and the amplifier means described above. Likewise, the receiver comprises the receiver means described above.

The communication system further comprises means for processing each incoming data signal, for determining which of the incoming data signals is a most accurate reproduction of the outgoing data signal, and for selecting the incoming data signal that is the most accurate reproduction. Alternatively, the communication system further comprises means for analyzing each of the incoming data signals and for producing a composite signal based on an analysis of the incoming data signals.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment which is preferred, it being understood, however, that the invention is not limited to the specific methods and instrumentalities disclosed. In the drawings.

DETAILED DESCRIPTION OF THE PREFERRED EMBODIMENT

Figure 1:
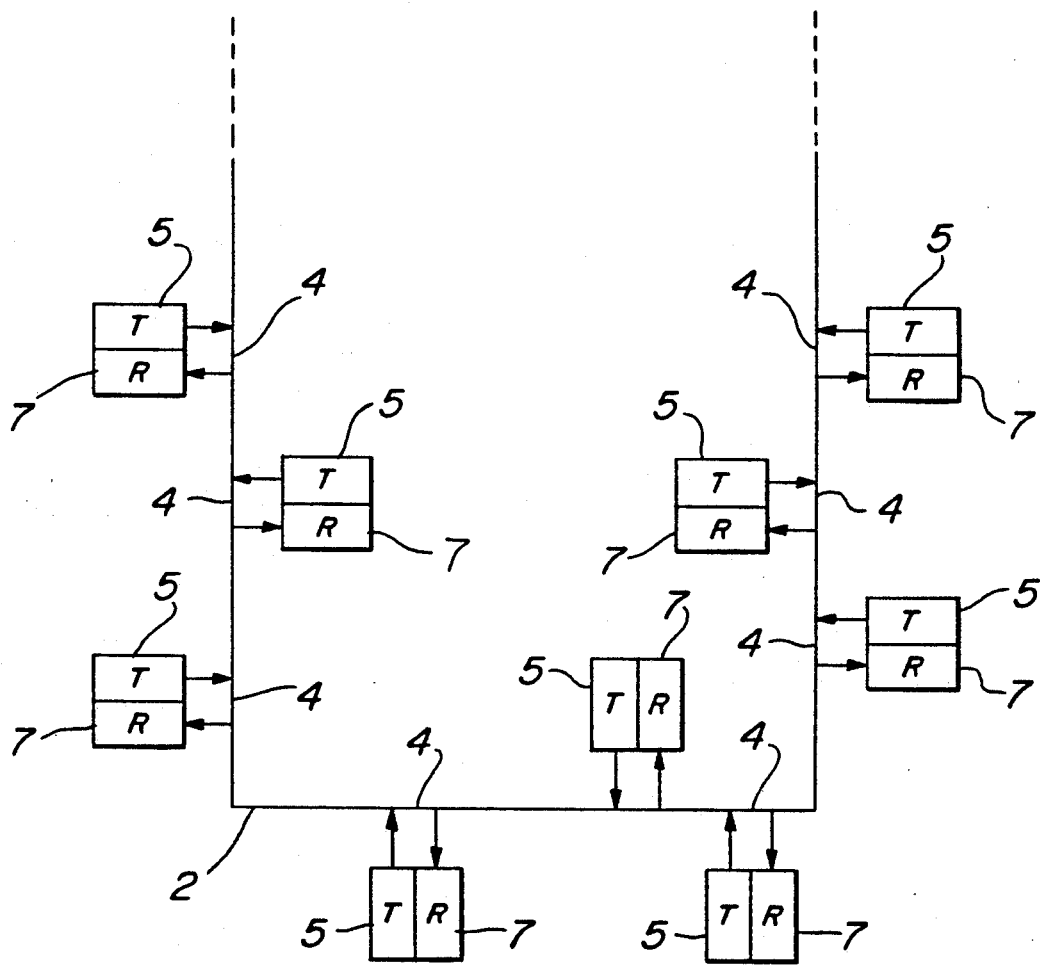
FIG. 1 is a block diagram of a power distribution line communication system having a transmitter and a receiver at each of a plurality of remote locations in accordance with the present invention.

Referring to the drawings in detail, wherein like numerals indicate like elements throughout, there is shown in FIG. 1, a preferred embodiment of a communication system for providing two-way communication among a plurality of remote locations 4 via a power distribution line 2, in accordance with the present invention. As shown in the Figure, in the preferred embodiment, each of the remote locations 4 has a transmitter 5 and a receiver 7 for transmitting outgoing signals and for receiving incoming signals respectively. It is within the spirit and scope of the present invention, however, for certain of the remote locations 4 to have only a transmitter 5, and other of the remote locations to have only a receiver 19. Thus, the communication system of the present invention is not limited to two-way communications, but may provide one-way communication, two-way communication, or both. The communication system of the present invention reduces the effects of signal cancellation at locations along the distribution line 2, thereby ensuring that outgoing data signals are receivable at each remote location 4.

In prior art distribution line communication systems, an outgoing data signal typically is modulated on a single sinusoidal carrier signal having a certain frequency. The modulated carrier signal is then impressed on the distribution line for transmission to various remote locations. At the remote locations, the modulated carrier signal is received and demodulated to recover a reproduction of the outgoing data signal.

Figure 3:
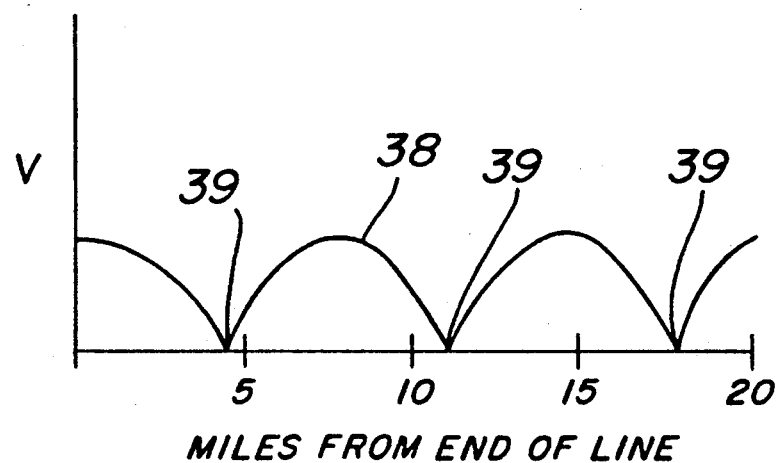
FIG. 3 is a plot of the voltage magnitude of a single carrier signal at different locations along a power distribution line in a prior art communication system.

Power distribution lines typically are open-circuited at one end. Consequently, a carrier signal propagating along a distribution line is reflected at the open-circuit end due to the large impedance mismatch provided by the open-circuit. The reflection propagates in the opposite direction at the same frequency and combines with the original carrier signal, creating a standing wave along the distribution line. As a result, the carrier signal amplitude is cancelled at fixed locations along the distribution line, severely inhibiting signal reception at these fixed locations. This situation is illustrated graphically in FIG. 3. In the Figure, the voltage magnitude of a single carrier signal 38 is shown for different locations along a power distribution line. As can be seen from the Figure, because of the standing wave pattern the voltage magnitude periodically cancels at fixed locations 39 along the distribution line. Receivers at these locations are unable to recover the outgoing data signal. Currently, to overcome this problem, signal repeaters (not shown) are employed to boost the carrier signal near these locations. However, signal repeaters are expensive to install and require the installer to determine the best location for the repeaters.

Obviating the need for signal repeaters, the present invention recognizes that the distance between fixed locations of signal cancellation is a function of the frequency of the carrier signal; carrier signals of different frequencies will experience signal cancellation at different locations along the same distribution line. The communication system and method of the present invention take advantage of this principle by modulating the same outgoing data signal on a plurality of carrier signals having different frequencies and simultaneously impressing the modulated carrier signals on the distribution line for transmission to remote locations. The carrier signal frequencies are selected such that all of the carrier signals will not cancel at a same location on the distribution line. Thus at least one carrier signal will have a substantial amplitude at each remote location, avoiding the need for signal repeaters.

Figure 4:
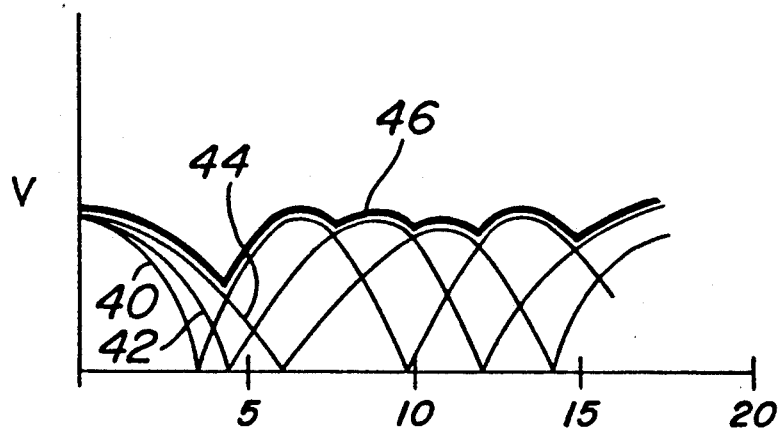
FIG. 4 is a plot of the voltage magnitude of three carrier signals, each of a different frequency, simultaneously transmitted over the same power distribution line in accordance with the present invention.

The concept of the present invention is illustrated graphically in FIG. 4. In the Figure, carrier signals 40, 42 and 44 have different frequencies selected such that all of the signals will not cancel at a same location along the distribution line. When these signals 40, 42, 44 are then modulated with the same outgoing data signal and simultaneously impressed on the distribution line, a signal amplitude 46 is present at every location along the distribution line.

In the preferred embodiment the plurality of carrier signals comprises a first, a second and a third carrier signal, having frequencies of 9.615 kHz, 12.5 kHz and 14.7 kHz respectively. These frequencies are selected because experiment has shown that all of the carrier signals will not cancel at a same location along the distribution line. It is understood by those skilled in the art, however, that while the carrier signals of the preferred embodiment have frequencies of 9.615 kHz, 12.5 kHz and 14.7 kHz, other frequencies can be selected provided that all of the carrier signals will not cancel at a same location along the distribution line. Furthermore, it is within the spirit and scope of the present invention to use more or less than three carrier signals.

In the preferred embodiment, one of the carrier frequencies is selected such that it is equal to the carrier frequency of an existing single carrier communication system (not shown) for maintaining compatibility with that system. Thus, for example, in the preferred embodiment, the lowest frequency of 9.615 kHz is chosen for compatibility with an existing single carrier communication system (not shown) which operates with a carrier frequency of 9.615 kHz. It is understood by those skilled in the art that single carrier communication systems exist which operate at other frequencies, and therefore, the lowest frequency may be altered accordingly to maintain compatibility with such systems.

Figure 2:
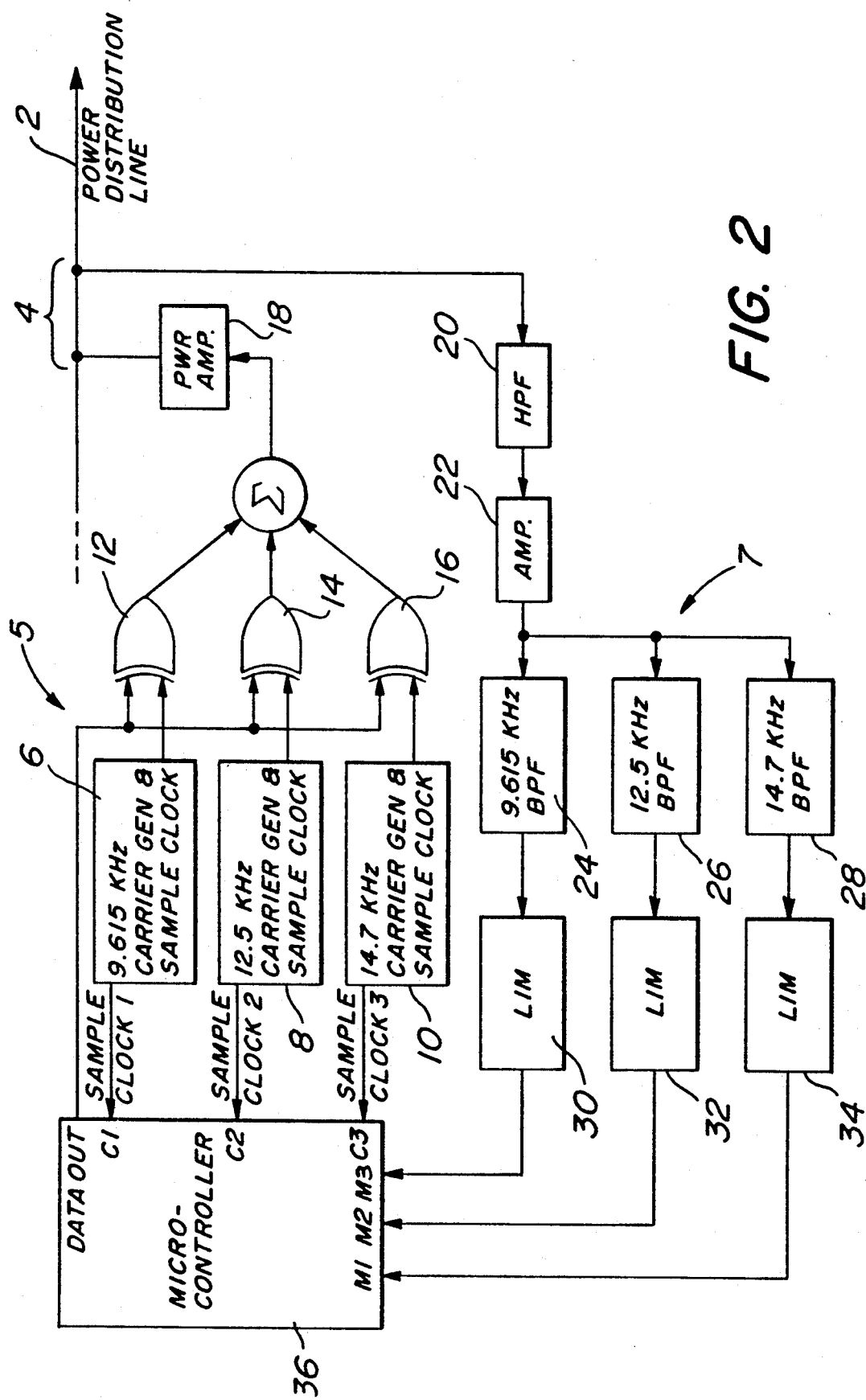
FIG. 2 is a detailed block diagram of the transmitter and receiver of FIG. 1.

Referring now to FIG. 2, there is shown a block diagram of the transmitter 5 and the receiver 7 in accordance with the present invention. As described hereinafter in greater detail, a portion of the functionality of the transmitter 5 and a portion of the functionality of the receiver 7 are provided by a microcontroller 36 having a data output, first, second and third sample clock inputs, and first, second and third modulated carrier inputs.

The transmitter 5 comprises data generating means, carrier signal generation means, modulation means and amplifier means. In the preferred embodiment, the data generating means is provided by the microcontroller 36 which generates an outgoing binary data signal intended for one or more of the remote locations. It is within the scope and spirit of the present invention, however, for the microcontroller 36 to generate any form of data signal, such as an analog data signal.

Referring still to FIG. 2, in the preferred embodiment, the carrier signal generation means comprises first, second, and third signal generation circuits 6, 8, 10 which generate first, second and third carrier signals and first, second and third sample clock signals respectively. As mentioned above, in the preferred embodiment, the first, second and third carrier signals are sinusoidal carrier signals having frequencies of 9.615 kHz, 12.5 kHz and 14.7 kHz respectively; the frequencies being selected such that all three of the carrier signals do not cancel at a same location along the distribution line. The sample clock signals each comprise a binary pulse train having bit rates of 72.8 bits/s, 76.22 bits/s and 73.5 bits/s respectively. As hereinafter described, the clock signals indicate the data rate at which each of the respective carrier signals will be modulated. It is appreciated by those skilled in the art that the clock signals may operate at any suitable rate and are not limited to the rates herein described. Also, the functionality of the first, second and third signal generation circuits 6, 8, 10, herein described, is well known to those skilled in the art and can be implemented in many ways. Without deviating from the spirit and scope of the present invention, the first, second and third signal generation circuits are not limited to any one implementation.

Again referring to FIG. 2, the modulation means comprises first, second and third modulators 12, 14 and 16 respectively. Each of the modulators 12, 14, 16 has a data input, a carrier signal input and a modulated carrier signal output. The data input of each modulator 12, 14, 16 is coupled to the data output of the microcontroller 36 such that each modulator receives the same outgoing data signal from the microcontroller 26. The carrier signal inputs of the first, second and third modulators are coupled to the carrier signal outputs of the first, second and third signal generation circuits 6, 8, 10 respectively for receiving therefrom the first, second and third carrier signals. The carrier signals are then individually modulated by the respective modulators 12, 14, 16 to produce first, second and third modulated carrier signals.

Figure 5:
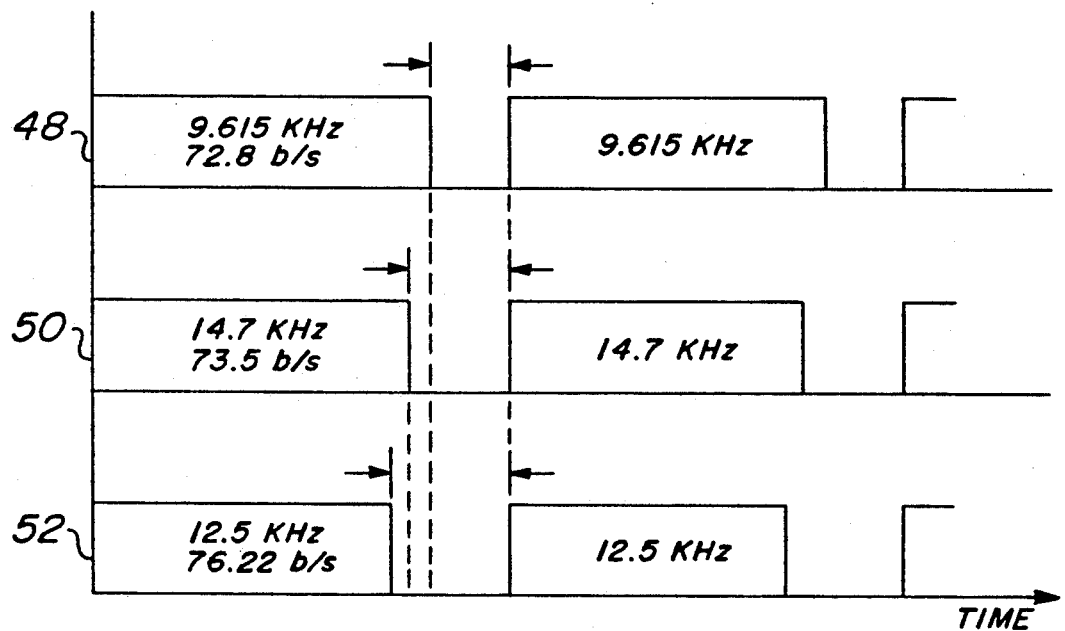
FIG. 5 is a timing diagram indicating the initiation and completion of the transmission of three modulated carrier signals in accordance with the present invention.

In the preferred embodiment, wherein the outgoing data signal is a binary signal, the first, second and third modulators are phase-shift-key modulators for individually phase-shift-key modulating the respective carrier signals with the same outgoing data signal. In the preferred embodiment, the first, second and third carrier signals are phase-shift-keyed at data rates determined by the first, second and third sample clock signals respectively. Thus, the first carrier signal is phase-shift-keyed with the outgoing data signal at a rate of 72.8 bits/s; the second carrier signal is phase-shift-keyed at a rate of 76.22 bits/s; and the third carrier signal is phase-shift-keyed at a rate of 73.5 bits/s. Referring briefly to FIG. 5 wherein a timing diagram of the first, second and third modulated carrier signals is shown, it can be seen that while the transmission of each modulated carrier signal is simultaneously started, the transmissions complete at different times due to the different data rates. Return reply messages cannot be initiated until the slowest transmission (72.8 bits/s) has completed. To maintain compatibility with existing single carrier communication systems, the bit timing for initiation of all three transmissions is equal to the bit timing of the single carrier system. Obviously, if there is no existing single carrier communication system, the bit timing for initiation of the three transmission would not be so restricted.

The phase-shift-key modulation technique, herein described, is well known to those skilled in the art, and there are many ways to implement such a technique. Without deviating from the spirit and scope of the present invention, the first, second and third modulators are not limited to any one implementation. Furthermore, it is understood by those skilled in the art that a technique other than phase-shift-key modulation may be used such as on-off key modulation or frequency-shift-key modulation.

Still referring to FIG. 2, the modulated carrier signal outputs of the first, second and third modulators are coupled to amplifier means for amplifying the modulated carrier signals. In the preferred embodiment, the amplifier means comprises a standard amplifier 18 of a type well known to those skilled in the art. Therefore, for purposes of convenience only, further description of the amplifier 18 is neither necessary nor limiting. As illustrated in the Figure, the amplifier 18 has an output operatively coupled to the distribution line 2 for simultaneously impressing the amplified carrier signals on the distribution line 2 for transmission to other remote locations 4. It is understood by those skilled in the art that the gain of amplifier 18 can be altered as necessary to provide sufficient gain for various distribution line lengths. Furthermore, without deviating from the scope and spirit of the invention, the amplifier means could be removed from the transmitter 5 altogether.

In transmitter operation, the microcontroller 36 generates an outgoing binary data signal intended for receipt by one or more remote locations 4 and transmits the data signal to each of the modulators 12, 14, 16. The first, second and third signal generation circuits 6, 8, 10 generate first, second and third carrier signals having frequencies of 9.615 kHz, 12.5 kHz and 14.7 kHz respectively. The carrier signals are respectively transmitted to the first, second and third modulators 12, 14, 16 which phase-shift-key modulate each of the carrier signals with the same outgoing data signal at bit rates of 72.8 bits/s, 76.22 bits/s and 73.5 bits/s respectively, thereby producing first, second and third modulated carrier signals. The modulated carrier signals are then transmitted to the amplifier 18 which amplifies the signals and simultaneously impresses the signals on the distribution line 2 for transmission to the remote location(s) 4. The carrier frequencies are selected such that all of the modulated carrier signals will not cancel at a same location along the distribution line, and therefore, the outgoing data signal can be substantially recovered at every remote location 4 without the use of signal repeaters.

Again referring to FIG. 2, the receiver 7 comprises demodulation means and data signal recovery means. Briefly, the receiver 7 is employed at a remote location to receive incoming first, second and third modulated carrier signals transmitted, as described above, from some other location. Once received, the incoming first, second and third modulated carrier signals are demodulated to recover therefrom a first, second and third incoming data signal. Each of the recovered data signals is a reproduction of the same outgoing data signal. However, because different carrier frequencies are effected by signal cancellation differently at a given location, some of the recovered data signals will be a more accurate reproduction of the outgoing data signal than others. Consequently, as discussed below in greater detail, the data recovery means determines which of the recovered data signals is the most accurate reproduction of the outgoing data signal, or alternatively, produces a composite signal based on an analysis of all three recovered data signals.

Much of the functionality of the receiver is provided by the microcontroller 36, as discussed hereinafter. However, as shown in FIG. 2, a portion of the demodulation means comprises a high-pass filter 20 operatively coupled to the distribution line; a second amplifier 22 operative coupled to the high-pass filter; first, second and third bandpass filters 24, 26 and 27 each operatively coupled to the amplifier; and first, second and third limiter circuits 30, 32, 34 operatively coupled to the first, second and third band-pass filters 24, 26 and 28 respectively. The outputs of the first, second and third limiter circuits are operatively coupled to the first, second and third modulated carrier signal inputs of the microcontroller 36 which, as discussed hereinafter, provides the remainder of the receiver's 7 functionality.

In receiver operation, the high-pass filter 20 filters out the 60 Hz power line frequency, allowing the first, second and third modulated carrier signals to pass therethrough to the amplifier 22 for amplification. The functionality of the high-pass filter 20 and amplifier 22 are well known to those skilled in the art and can be implemented in many ways. Without deviating from the spirit and scope of the present invention, the high-pass filter 20 and amplifier 22 are not limited to any one implementation. The modulated carrier signals are then transmitted to the first, second and third band-pass filters which, in the preferred embodiment, are tuned respectively to 9.615 kHz, 12.5 kHz and 14.7 kHz. These filters operate to isolate the first, second and third modulated carrier signals respectively for separate demodulation. Again, the functionality of the first, second and third band-pass filters is well known to those skilled in the art and can be implemented in many ways. Any such implementation may be employed without deviating from the spirit and scope of the present invention.

The first, second and third modulated carrier signals, as isolated by the band-pass filters 24, 26, 28, are then passed respectively to the first, second and third limiter circuits 30, 32, 34 which square-up the modulated carrier signals in preparation for demodulation by the microcontroller 36. The functionality of the limiter circuits again is well known to those skilled in the art and the circuits are not limited to any one implementation. The first, second and third modulated carrier signals are then fed to the microcontroller 36 for demodulation.

As mentioned above in the discussion of the transmitter 5, in the preferred embodiment the modulated carrier signals are produced by a phase-shift-key modulation technique wherein the first, second and third carrier signals are individually phase-shift-key modulated at data rates of 72.8 bits/s, 76.22 bits/s and 73.5 bits/s respectively. Consequently, in the preferred embodiment of the receiver 5, the microcontroller 36 employs a phase-shift-key demodulation technique to individually demodulate each of the incoming modulated carrier signals. The first, second and third sample clock signals transmitted, as discussed above, to the microcontroller 36 from the first, second and third signal generation circuits 6, 8, 10 provide the microcontroller 36 with the 72.8 bits/s, 76.22 bits/s and 73.5 bits/s sampling rates necessary for demodulation.

As a result of the demodulation of the first, second and third modulated carrier signals, a first, second and third incoming data signal is recovered. Each of the recovered data signals is a reproduction of the same outgoing data signal, and therefore, are likewise binary data signals. As discussed previously, because different carrier frequencies are effected by signal cancellation differently at a given location, some of the recovered data signals will be a more accurate reproduction of the outgoing data signal than others.

In the preferred embodiment, to achieve the most accurate reproduction of the outgoing data signal, the microcontroller 36 successively examines the bits of the first, second and third incoming data signals and employs a majority voting technique to produce a composite signal which is a more accurate reproduction of the outgoing data signal than any one of the incoming data signals. For example, assume the sequence of bits in the outgoing data signal is (111011110 . . . ) and that due to errors caused by varying degrees of signal cancellation at the receiving location, the sequence of bits in the first, second and third incoming data signals are (111011010 . . . ), (110011110 . . . ), (111011110 . . . ) respectively. The composite signal, based on a bit by bit majority vote of the three incoming data signals is (111011110 . . . ), an accurate reproduction of the outgoing data signal.

Alternatively, rather than producing a composite signal, the microcontroller 36 can determine which of the incoming data signals is the most accurate reproduction of the outgoing data signal. Such a determination requires some form of error detection such as parity error detection; the most accurate incoming data signal is the signal having the least errors. It is understood by those skilled in the art that there are many methods for detecting errors in binary transmissions, and without deviating from the spirit and scope of the present invention, any such error detecting method can be employed.

It is also understood by those skilled in the art that demodulation of the first, second and third modulated carrier signals may alternatively be performed by separate first, second and third phase-shift-key demodulators respectively, rather than by the microcontroller 36. For example, the outputs of the first, second and third limiter circuits can be coupled respectively to first, second and third phase-shift-key demodulators (not shown). Phase-shift-key demodulators, such as that disclosed in U.S. Pat. No. 4,311,964, are well known in the art. The microcontroller 36 would be used solely to process the recovered data signals as described above, thereby simplifying its functionality.

Additionally, although the communication system herein described is employed on a single distribution line, it is understood by those skilled in the art that power distribution systems often employ multiple distribution lines or phase-conductors. In the past, prior art communication systems, such as that disclosed in U.S. Pat. No. 4,357,598, have attempted to increase reliability by transmitting a single modulated carrier signal over each of the distribution lines thereby providing a form of redundancy. It is understood that the present invention could be employed in conjunction with such systems as an improvement thereto by coupling the transmitters and receivers of the present invention to each of the distribution lines in the multiple line system. Thus, instead of a single modulated carrier signal being transmitted over each distribution line as in the prior art, a plurality of modulated carrier signals, in accordance with the present invention, would be transmitted over each distribution line.

From the foregoing description, it can be seen that the present invention comprises a power distribution line communication system for, and method of, reducing effects of signal cancellation at locations along the distribution line due to standing waves caused by reflections of a carrier signal impressed on the distribution line. The communications system reduces such effects by modulating an outgoing data signal on each of a plurality of carrier signals, having different frequencies selected such that all the carrier signals do not cancel at a same location along the distribution line. The modulated carrier signals are then simultaneously impressed on the distribution line for transmission to remote locations. The communication system of the present invention obviates the need for signal repeaters along the distribution line, which can be both expensive and difficult to install. It will be appreciated by those skilled in the art, that changes could be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims.

What is claimed is:

1. A power distribution line communication system for reducing effects of signal cancellation at locations along the distribution line due to standing waves caused by reflections of a carrier signal impressed on the distribution line, wherein the locations of the signal cancellation are a function of the frequency of the carrier signal, comprising:

data generating means for generating an outgoing data signal;

carrier signal generation means for generating a plurality of carrier signals, each of the carrier signals having a different frequency, each frequency being selected such that all of the carrier signals will not cancel at a same location on the distribution line;

modulation means operatively coupled to the data generation means and to the carrier signal generation means for modulating each of the carrier signals with the outgoing data signal; and amplifier means operatively coupled to the modulation means and to the distribution line for simultaneously impressing each of the modulated carrier signals on the power distribution line for transmission to a plurality of remote locations.

2. The communication system of claim 1 wherein the plurality of carrier signals comprises a first carrier signal, a second carrier signal and a third carrier signal.

3. The communication system of claim 2 wherein the frequencies of the first, second and third carrier signals are 9.615 kHz, 12.5 kHz and 14.7 kHz respectively.

4. The communication system of claim 1 wherein one of the carrier frequencies is equal to the frequency of an existing single carrier communication system for maintaining compatibility with the existing communication system.

5. The communication system of claim 1 wherein the outgoing data signal is a binary data signal.

6. The communication system of claim 1 further comprising:

receiver means located at each of the remote locations and operatively coupled to the distribution line for demodulating each of the modulated carrier signals and for recovering an incoming data signal from each of the demodulated carrier signals, each of the incoming signals being a substantial reproduction of the outgoing data signal.

7. The communication system of claim 6 further comprising means for processing each incoming data signal, for determining which of the incoming data signals is a most accurate reproduction of the outgoing data signal, and for selecting the incoming data signal that is the most accurate reproduction of the outgoing data signal.

8. The communication system of claim 7 wherein the means for processing, for determining and for selecting comprises a microcontroller.

9. The communication system of claim 6 further comprising means for analyzing each incoming data signal and for producing a composite signal based on an analysis of the incoming data signals.

10. The communication system of claim 9 wherein the means for analyzing employs a majority voting technique.

11. The communication system of claim 9 wherein the means for producing comprises a microcontroller.

12. The communication system of claim 6 wherein the outgoing data signal is a binary data signal and wherein the carrier signals are phase-shift-key modulated with the outgoing binary data signal.

13. The communication system of claim 12 wherein each carrier signal is phase-shift-key modulated at its own carrier data rate.

14. The communication system of claim 13 wherein the receiver means includes a coherent phase-shift-keyed demodulator for demodulating each of the modulated carrier signals.

15. A power distribution line communication system for reducing effects of signal cancellation at locations along the distribution line due to standing waves caused by reflections of a carrier signal impressed on the distribution line, wherein the locations of the signal cancellation are a function of the frequency of the carrier signal, comprising:

data generating means for generating an outgoing data signal;

carrier signal generation means for generating a plurality of carrier signals, each of the carrier signals having a different frequency, each frequency being selected such that all of the carrier signals will not cancel at a same location on the distribution line;

modulation means operatively coupled to the data generation means and to the carrier signal generation means for modulating each of the carrier signals with the outgoing data signal;

amplifier means operatively coupled to the modulation means and to the distribution line for simultaneously impressing each of the modulated carrier signals on the power distribution line for transmission to a plurality of remote locations; and receiver means located at each of the remote locations and operatively coupled to the distribution line for demodulating each of the modulated carrier signals and for recovering an incoming data signal from each of the demodulated carrier signals, each of the incoming data signals being a substantial reproduction of the outgoing data signal.

16. The communication system of claim 15 wherein the plurality of carrier signals comprises a first carrier signal, a second carrier signal and a third carrier signal.

17. The communication system of claim 16 wherein the frequencies of the first, second and third carrier signals are 9.615 kHz, 12.5 kHz and 14.7 kHz respectively.

18. The communication system of claim 15 wherein one of the carrier frequencies is equal to the frequency of an existing single carrier communication system for maintaining compatibility with the existing communication system.

19. The communication system of claim 15 wherein the outgoing data signal is a binary data signal.

20. The communication system of claim 15 further comprising means for processing each incoming data signal, for determining which of the incoming data signals is a most accurate reproduction of the outgoing data signal, and for selecting the incoming data signal that is the most accurate reproduction of the outgoing data signal.

21. The communication system of claim 20 wherein the means for processing, for determining and for selecting comprises a microcontroller.

22. The communication system of claim 21 further comprising means for analyzing each of the incoming data signals and for producing a composite signal based on an analysis of the incoming data signals.

23. The communication system of claim 22 wherein the means for analyzing employs a majority voting technique.

24. The communication system of claim 22 wherein the means for analyzing and producing comprises a microcontroller.

25. The communication system of claim 15 wherein the outgoing data signal is a binary data signal and wherein the carrier signals are phase-shift-key modulated with the outgoing binary data signal.

26. The communication system of claim 25 wherein each carrier signal is phase-shift-key modulated at its own carrier data rate.

27. The communication system of claim 26 wherein the receiver means includes a coherent phase-shift-keyed demodulator for demodulating each of the modulated carrier signals.

28. A communication system for providing two-way communication among a plurality of remote locations via a power distribution line and for reducing effects of signal cancellation at locations along the distribution line due to standing waves caused by reflections of a carrier signal impressed on the distribution line, wherein the locations of the signal cancellation are a function of the frequency of the carrier signal, each of the remote locations having a transmitter and a receiver, the transmitter comprising:

data generating means for generating an outgoing data signal;

carrier signal generation means for generating a plurality of carrier signals, each of the carrier signals having a different frequency, each frequency being selected such that all of the carrier signals will not cancel at a same location on the distribution line;

modulation means operatively coupled to the data generation means and to the carrier signal generation means for modulating each of the carrier signals with the outgoing data signal;

amplifier means operatively coupled to the modulation means and to the distribution line for simultaneously impressing each of the modulated carrier signals on the power distribution line for transmission to at least one of the remote locations, the receiver comprising:

demodulation means operatively coupled to the distribution line for demodulating a plurality of modulated carrier signals; and data signal recovery means for recovering an incoming data signal from each of the demodulated carrier signals, each of the incoming data signals being a substantial reproduction of a same outgoing data signal.

29. The communication system of claim 28 wherein the plurality of carrier signals comprises a first carrier signal, a second carrier signal and a third carrier signal.

30. The communication system of claim 29 wherein the frequencies of the first, second and third carrier signals are 9.615 kHz, 12.5 kHz and 14.7 kHz respectively.

31. The communication system of claim 28 wherein one of the carrier frequencies is equal to the frequency of an existing single carrier communication system for maintaining compatibility with the existing communication system.

32. The communication system of claim 28 wherein the outgoing data signal is a binary data signal.

33. The communication system of claim 28 further comprising means for processing each incoming data signal, for determining which of the incoming data signals is a most accurate reproduction of the same outgoing data signal, and for selecting the incoming data signal that is the most accurate reproduction of the same outgoing data signal.

34. The communication system of claim 33 wherein the means for processing, for determining and for selecting comprises a microcontroller.

35. The communication system of claim 28 further comprising means for analyzing each of the incoming data signals and for producing a composite signal based on an analysis of the incoming data signals.

36. The communication system of claim 35 wherein the means for analyzing employs a majority voting technique.

37. The communication system of claim 35 wherein the means for analyzing and for producing comprises a microcontroller.

38. The communication system of claim 28 wherein the outgoing data signal is a binary data signal and wherein the carrier signals are phase-shift-key modulated with the outgoing binary data signal.

39. The communication system of claim 38 wherein each carrier signal is phase-shift-key modulated at its own carrier data rate.

40. The communication system of claim 39 wherein the demodulation means comprises a coherent phase-shift-keyed demodulator.

41. In a power distribution line communication system, a method of reducing effects of signal cancellation at locations along the distribution line due to standing waves caused by reflections of a carrier signal impressed on the distribution line, wherein the locations of signal cancellation are a function of the frequency of the carrier signal, comprising the steps of:
(a) generating an outgoing data signal;
(b) generating a plurality of carrier signals having different frequencies, the frequency of each carrier signal being selected such that all of the carrier signals will not cancel at a same location on the distribution line;
(c) modulating each of the carrier signals with the outgoing data signal; and
(d) simultaneously impressing the modulated carrier signals on the power distribution line for transmission to a plurality of remote locations.

42. The method of claim 41 further comprising the steps of:
(e) demodulating each of the modulated carrier signals at at least one of the remote locations; and
(f) recovering an incoming data signal from each of the demodulated carrier signals.

43. The method of claim 42 further comprising the steps of:
(g) processing each of the incoming data signals;
(h) determining which of the incoming data signals is a most accurate reproduction of the outgoing data signal; and
(i) selecting the incoming data signal that is the most accurate reproduction of the outgoing data signal.

44. The method of claim 42 further comprising the steps of:
(g) analyzing each of the incoming data signals; and
(h) producing a composite signal based on an analysis of the incoming data signals.

45. The method of claim 44 wherein the step of analyzing each of the incoming data signals employs a majority voting technique.

46. A communication system for providing two-way communication among a plurality of remote locations via a power distribution line and for reducing effects of signal cancellation at locations along the distribution line due to standing waves caused by reflections of a carrier signal impressed on the distribution line, wherein the locations of the signal cancellation are a function of the frequency of the carrier signal, each of the remote locations having a transmitter and a receiver, the transmitter and receiver being operatively coupled to a microcontroller having a data output; first, second and third clock inputs; and first, second and third incoming modulated carrier inputs, the transmitter comprising:

signal generation circuitry having first, second and third clock outputs operatively coupled to the first, second and third clock inputs respectively of the microcontroller for generating first, second and third clock signals and for transmitting the clock signals to the microcontroller, the first, second and third binary clock signals having rates of 72.8 bits/s, 76.22 bits/s and 73.5 bits/s respectively, the signal generation circuitry further having first, second and third carrier signal outputs for generating first, second and third carrier signals, the first, second and third carrier signals having frequencies of 9.615 kHz, 12.5 kHz and 14.7 kHz respectively, each carrier signal frequency being selected such that all of the carrier signals will not cancel at a same location on the distribution line;

first, second and third modulating circuits each having a carrier input, a data input and an output, the carrier inputs of the first, second and third modulating circuits being operatively coupled to the first, second and third carrier outputs respectively of the signal generation circuitry, the data inputs of each of the modulating circuits being operatively coupled to the data output of the microcontroller for each receiving an outgoing data signal from the microcontroller and for phase-shift-key modulating the first, second and third carrier signals with the outgoing data signal, the first second and third carrier signals being so-modulated at the first, second and third clock rates respectively;

an amplifier operatively coupled to each of the outputs of the first, second and third modulating circuits and to the distribution line for amplifying the modulated first, second and third carrier signals and for simultaneously impressing the modulated first, second and third carrier signals on the distribution line for transmission to at least one of the remote locations, each receiver comprising:

a high-pass filter having an input and an output, the input being operatively coupled to the distribution line for filtering out low frequency signals and for allowing incoming first, second and third modulated carrier signals to pass therethrough;

an amplifier having an input and an output, the input of the amplifier being operatively coupled to the output of the high-pass filter for amplifying the incoming first, second and third modulated carrier signals;

first, second and third bandpass filters tuned to 9.615 kHz, 12.5 kHz and 14.7 kHz respectively, each filter having an input and an output, each input being operatively coupled to the output of the amplifier, the first, second and third bandpass filters for isolating the incoming first, second and third modulated carrier signals respectively;

first, second and third limiter circuits each having an input and an output, the inputs of the first, second and third limiter circuits being operatively coupled to the outputs of the first, second and third bandpass filters respectively for squaring up the incoming first, second and third modulated carrier signals, the outputs of the first, second and third limiter circuits being operatively coupled to the first, second and third data signals inputs for transmitting the first, second and third incoming data signals to the microcontroller; the outputs of the first, second and third demodulator circuits being operatively coupled to the first, second and third incoming data signal inputs of the microcontroller for transmitting the incoming data signals to the microcontroller, the microcontroller for generating the outgoing data signal, for transmitting the outgoing data signal to the input of each of the first, second and third modulator circuits, for demodulating the incoming first, second and third modulated carrier signals, for recovering a first, second and third incoming data signal from the first, second and third demodulated carrier signals, each of the incoming data signals being a substantial reproduction of a same outgoing data signal, and for processing each of the incoming data signal, for determining which of the incoming data signals is a most accurate reproduction of the same outgoing data signal, and for selecting the incoming data signal that is the most accurate reproduction of the same outgoing data signal.

47. A communication system for providing two-way communication among a plurality of remote locations via a power distribution line and for reducing effects of signal cancellation at locations along the distribution line due to standing waves caused by reflections of a carrier signal impressed on the distribution line, wherein the locations of the signal cancellation are a function of the frequency of the carrier signal, each of the remote locations having a transmitter and a receiver, the transmitter and receiver being operatively coupled to a microcontroller having a data output; first, second and third clock inputs; and first, second and third incoming modulated carrier inputs, the transmitter comprising:

signal generation circuitry having first, second and third clock outputs operatively coupled to the first, second and third clock inputs respectively of the microcontroller for generating first, second and third clock signals and for transmitting the clock signals to the microcontroller, the first, second and third binary clock signals having rates of 72.8 bits/s, 76.22 bits/s and 73.5 bits/s respectively, the signal generation circuitry further having first, second and third carrier signal outputs for generating first, second and third carrier signals, the first, second and third carrier signals having frequencies of 9.615 kHz, 12.5 kHz and 14.7 kHz respectively, each carrier signal frequency being selected such that all of the carrier signals will not cancel at a same location on the distribution line;

first, second and third modulating circuits each having a carrier input, a data input and an output, the carrier inputs of the first, second and third modulating circuits being operatively coupled to the first, second and third carrier outputs respectively of the signal generation circuitry, the data inputs of each of the modulating circuits being operatively coupled to the data output of the microcontroller for each receiving an outgoing data signal from the microcontroller and for phase-shift-key modulating the first, second and third carrier signals with the outgoing data signal, the first second and third carrier signals being so-modulated at the first, second and third clock rates respectively;

an amplifier operatively coupled to each of the outputs of the first, second and third modulating circuits and to the distribution line for amplifying the modulated first, second and third carrier signals and for simultaneously impressing the modulated first, second and third carrier signals on the distribution line for transmission to at least one of the remote locations, each receiver comprising:

a high-pass filter having an input and an output, the input being operatively coupled to the distribution line for filtering out low frequency signals and for allowing incoming first, second and third modulated carrier signals to pass therethrough;

an amplifier having an input and an output, the input of the amplifier being operatively coupled to the output of the high-pass filter for amplifying the incoming first, second and third modulated carrier signals;

first, second and third bandpass filters tuned to 9.615 kHz, 12.5 kHz and 14.7 kHz respectively, each filter having an input and an output, each input being operatively coupled to the output of the amplifier, the first, second and third bandpass filters for isolating the incoming first, second and third modulated carrier signals respectively;

first, second and third limiter circuits each having an input and an output, the inputs of the first, second and third limiter circuits being operatively coupled to the outputs of the first, second and third bandpass filters respectively for squaring up the incoming first, second and third modulated carrier signals, the outputs of the first, second and third limiter circuits being operatively coupled to the first, second and third data signal inputs for transmitting the first, second and third incoming data signals to the microcontroller; the outputs of the first, second and third demodulator circuits being operatively coupled to the first, second and third incoming data signal inputs of the microcontroller for transmitting the incoming data signals to the microcontroller, the microcontroller for generating the outgoing data signal, for transmitting the outgoing data signal to the input of each of the first, second and third modulator circuits, for demodulating the incoming first, second and third modulated carrier signals, for recovering a first, second and third incoming data signal from the first, second and third demodulated carrier signals, each of the incoming data signals being a substantial reproduction of a same outgoing data signal, and for analyzing each of the incoming data signals and for producing a composite signal based on an analysis of the incoming data signals.

48. The communication system of claim 47 wherein the microcontroller analyzes the incoming data signals by a majority voting technique.

* * * * *